United States Patent Office  3,484,229
Patented Dec. 16, 1969 }

3,484,229
MICROBIAL POLYSACCHARIDE GUMS AS HERBICIDE SPRAY DRIFT CONTROL AGENTS
John D. Floyd, Wilmington, and Martin J. O'Connor, Newark, Del., assignors to Hercules Incorporated, a corporation of Delaware
No Drawing. Filed Mar. 28, 1966, Ser. No. 537,703
Int. Cl. A01n *17/00, 17/10*
U.S. Cl. 71—93                    6 Claims

ABSTRACT OF THE DISCLOSURE

Biologically active easily sprayable compositions having low spray drift properties including water, a biologically active agent, and a microbial polysaccharide gum produced by fermentation of *Arthrobacter viscosus* NRRL B–1973 or *Arthrobacter viscosus* NRRL B–1797.

The present invention relates to improved biologically active compositions and process, and more particularly to such compositions having low spray drift properties.

Biologically active materials, e.g., herbicides, fungicides, bactericides, nematocides, plant growth regulating chemicals, etc., are usually applied in the form of an aqueous solution or a dispersion and the dispersion is usually of the oil in water type wherein the biologically active agent is dissolved in an organic solvent and the resulting solution is stably dispersed or emulsified in water, the organic solvent being the discrete or discontinuous phase and the water being the continuous phase of the dispersion. However, the dispersions can be of the water in oil type, i.e. the type wherein water is the discrete phase and oil is the continuous phase.

These biologically active materials are usually applied by spraying either from ground equipment or aerial equipment. When these formulations are applied by aerial equipment, either helicopter or fixed wing aircraft are used. In either case the pressure required to apply the material is low (i.e. about 25–35 p.s.i.) but it is often necessary that the free fall distance be fairly long. On the other hand, in certain instances when the formulations are applied by ground spray equipment, rather high pressure pumping (e.g. up to about 200 p.s.i.) is necessary in order to obtain the desired coverage.

Any of the foregoing application methods subject the formulation to relatively high rates of shear which act upon the cohesive forces of the liquid. In an aqueous solution or dispersion these cohesive forces are quite low and the shear on the liquid reduces the liquid structure to very fine particles or droplets. This is particularly true in the case of oil in water dispersions wherein the dispersion stabilizers used promote the formation and maintenance of fine droplets. The ultimate in fine droplet formation is the production of a fog or stable aerosol of fine particles. When this fogging or misting occurs, winds at the spraying site will carry the formulation away from the area being sprayed and onto neighboring areas where it is not wanted. This results in loss of expensive formulation, and in many cases damage to or the destruction of valuable plants.

Aside from the necessary property of high biological activity, formulations should:

(1) Be readily reduced to small enough particles to give good coverage but not be reducible to very fine particles which would cause the formulation to drift when applied by spraying.

(2) Be easily pumped through pipes and orifices.

(3) Have good physical stability, i.e. they should not separate into two or more phases.

In order to control drift, it is necesary to minimize the production of fines in the spray. Prior art proposals for drift control are not as satisfactory as desired.. In formulations which are aqueous solutions or oil in water dispersions, the prior art proposes to achieve this by the use of water soluble or water swellable agents (e.g. polymers) which bind the water in the formulation. With the latter agents the objective is to bind the water into the individuals gels of the polymer to the point where there remains substantially no free liquid. When this is done the smallest particle to which the system is reducible on spraying is the individual gel particle. The main problem with this system is that when enough polymer is used to bind all of the water in the formulation, it cannot be satisfactorily sprayed due to its high viscosity. Thus in actual practice in order to be sufficiently sprayable, less than the optimum amount of such polymer needed for adequate drift control must be used. Another problem with this prior art system is that the size of the gels, and therefore their water binding capacity, is quite sensitive to the presence of dissolved electrolytes in the formulation.

A somewhat more satisfactory prior art system involves the use of soluble thickening agents which more or less bind all of the water in the system. The drawback to this prior art system is that the viscosity of the formulation, required to give adequate drift control by preventing the formation of fines during the spraying process, is so high that it makes the formulation too difficult to spray.

Thus, it would be highly desirable to have a formulation which would provide a high viscosity under free fall conditions to prevent fines formation and thereby minimize or eliminate drifting, but which could be readily pumped and sprayed.

In accordance with the present invention it has been found that formulations containing biologically active materials and having the desired properties set forth hereinbefore are provided by employing therein a microbial polysaccharide gum produced by the submerged aerobic fermentation of an inoculum of a micro-organism selected from the group consisting of *Arthrobacter viscosus* NRRL B–1973 and *Arthrobacter viscosus* NRRL B–1797. These gums and process of preparing are set forth in U.S. Patent No. 3,228,855.

The examples given hereinafter illustrate various ways of practicing the present invention but they are not intended to limit the invention beyond the scope of the appended claims.

Examples 1–5

A typical 2-phase type commercial herbicide formulation was prepared as follows:

One gallon of a formulation containing 4 pounds of 2,4,5 - trichlorophenoxy acetic acid (2,4,5 - T) equivalent as the 2-ethylhexyl ester as the biologically active agent and 1.5 pounds of nonylphenyl polyethylene glycol ether (Tergitol NP–27) as a surface active agent were dissolved in 1 gallon of kerosene. All of this solution was then dispersed into each of five 16-gallon portions of tap water containing dissolved therein the following amounts of polysaccharide gum in percent by weight based on the total dispersion: zero, 0.2, 0.3, 0.5 and 0.7.

A 100 foot square test range was prepared as follows. Starting at one corner (called the zero corner for convenient reference) of the square a row of stakes were driven in the ground along two sides of the square at distances of 25, 10, 15, 25, and 25 feet, respectively. A stake was driven at each point formed by the intersections of lines extending from these posts at right angles to the opposite sides of the square, thus giving a total of 36 stakes. 8½ inch by 11 inch paper cards were placed at the ground level and at 5 foot height on each of the stakes.

With the orifice of the spray gun at a position about 4 feet directly above zero corner and aimed at the base of the nearest post on one side of the square, the above-described dispersions were sprayed into the atmosphere over the test range by slowly moving the spray gun in a given plane until it was aimed at the base of the corresponding stake on the opposite side of the square. The gun was slowly moved back and forth in the described plane until the spraying was completed. A standard John Bean Orchard gun, Spraymaster No. 15484, equipped with a No. 5 (0.078″) orifice, was employed using a compressed air pressure source maintained at a tank pressure of about 80 p.s.i. At the time the dispersions were sprayed there was both a tail wind and a cross wind at an average velocity of about 7–10 miles per hour.

When the control dispersion (i.e. the one containing no polysaccharide gum) was sprayed under the above-identified conditions, many fine droplets were formed which spotted the paper cards over the entire test range; in fact, plant foliage was substantially damaged by this spray as far as 300 feet downwind.

Although quite viscous, all of the dispersions containing the polysaccharide gum sprayed very easily. Even the lowest concentration of 0.2% polysaccharide gum gave a marked improvement in drift control, although a small number of fines were observed when this formulation was sprayed.

At concentrations of 0.3% polysaccharide and above, drifting was completely eliminated and no fines were observed in the spray. In addition all of these dispersions were mechanically stable, i.e. they did not separate into 2 phases during spraying or after several weeks static storage.

Brookfield viscosity was run on each of the above-identified five dispersions under four different shear forces, i.e. at 6 r.p.m., 12 r.p.m., 30 r.p.m., and 60 r.p.m. These data are given in Table 1 hereinafter.

and a particulate hydrophobic silica in oil type defoamer (described and claimed in U.S. Patent No. 3,076,768), to give an acid concentration of 10% and a defoamer concentration of 0.05% by weight of the total solution. Five such formulations were prepared containing in addition to the above-mentioned ingredients the following amounts of polysaccharide gum in percent by weight of the solution: zero, 0.2, 0.4, 0.6, and 0.8.

The solution formulations of these Examples 6–10 were test sprayed in the same manner as for Examples 1–5 and substantially the same results were obtained. When the control was sprayed numerous fines were noted in the spray and it drifted over the entire test range and beyond. All of the formulations containing polysaccharide gum were very viscous, sprayed easily, no fines were observed in the spray and substantially no drifting occurred.

As in Examples 1–5, Brookfield viscosity at various shear rates was determined on the formulations of Examples 6–10, the results for which are shown in Table 2 hereinafter.

TABLE 2

| Example | Percent gum [1] added | Brookfield viscosity (cps.) | | | | |
|---|---|---|---|---|---|---|
| | | Spindle | 6 r.p.m. | 12 r.p.m. | 30 r.p.m. | 60 r.p.m. |
| 6 | 0 (control) | 1 | | | | 4 |
| 7 | 0.2 | 2 | 830 | 600 | 330 | 215 |
| 8 | 0.4 | 3 | 5,200 | 3,150 | 1,480 | 840 |
| 9 | 0.6 | 4 | 14,000 | 7,500 | 3,300 | 1,900 |
| 10 | 0.8 | 4 | 26,000 | 14,500 | 6,200 | 3,400 |

[1] NRRL B-1973 gum.

In each of the formulations containing a polysaccharide gum of the present invention (i.e. the formulations in Examples 2–5 and 7–10 hereinbefore), the viscosity of the formulation is substantially reduced when subjected to shear but reverts to substantially the initial viscosity practically immediately after the shear forces are removed. Example 5 will now be used to elaborate on what is meant by this. When the formulation is subjected to the relatively mild shear forces of a No. 4 spindle of a Brookfield viscometer rotating at a speed of 6 r.p.m., the viscosity is 22,000 cps. As this shear force is increased by increasing the speed of the spindle to 12, 30 and 60 r.p.m., the formulation further breaks down to a viscosity of 12,000, 5400 and 3000 cps., respectively; however, when each of these last three are remeasured for viscosity at 6 r.p.m. as soon as possible after the first time (i.e. within 15–30 seconds after the first measurement), it is found that they have reverted to substantially their initial viscosity of 22,000 cps.

TABLE 1

| Example | Percent gum [1] added | Brookfield viscosity (cps.) | | | | |
|---|---|---|---|---|---|---|
| | | Spindle | 6 r.p.m. | 12 r.p.m. | 30 r.p.m. | 60 r.p.m. |
| 1 | 0 (control) | 1 | | | | 4 |
| 2 | 0.2 | 2 | 1,320 | 875 | 490 | 305 |
| 3 | 0.3 | 3 | 4,000 | 2,400 | 1,300 | 700 |
| 4 | 0.5 | 4 | 13,000 | 7,250 | 3,300 | 1,850 |
| 5 | 0.7 | 4 | 22,000 | 12,000 | 5,400 | 3,000 |

[1] NRRL B-1973 gum.

Examples 6–10

These Examples 6–10 were carried out in substantially the same way as were Examples 1–5 hereinbefore, the main difference being that in Examples 6–10 the formulations were in the form of a solution and a different biologically active agent was employed. More specifically, single phase, solution type, herbicide formulations were prepared by dissolving in water 4-amino, 3,5,6-trichloro picolinic acid (Piclonam) as the biologically active agent This was checked and found to be true even under a far greater range of shear. That is, when a formulation containing a polysaccharide gum of the present invention was (1) subjected to relatively mild shear it gave a viscosity of 31,000 cps., (2) when it was subjected to a far higher shear it gave a viscosity of only 27 cps., (3) but when the viscosity was remeasured under the low shear of (1) as soon as possible (i.e. within about 15–30 seconds) after the high shear, it was found that 100% reversion in viscosity had occurred from 27 cps. to 31,000 cps.

From the foregoing data it will be seen that the formulations of the present invention are (1) very viscous, (2) spray easily, and (3) eliminate drifting of the formulation when sprayed. More specifically it is apparent that the formulations of the present invention break down drastically in viscosity upon being subjected to shear forces such as those involved in normal spraying but that this viscosity loss is almost fully regained substantially immediately after the formulation passes through the spray nozzle and the shear forces thus removed. This causes the formulations to become very thin at the instant of spraying (and therefore very easy to spray) and yet very thick immediately after exiting the spray orifice (and therefore ideal for eliminating drifting of the sprayed formulations).

Judging from the prior art teachings the formulations of the present invention would be expected to be too difficult to spray because they are so viscous. However it was surprisingly found in accordance with the present invention that these formulations sprayed easily, and the reason for this was found to be due to the fact that their viscosity is drastically reduced under the shear forces to which they are inherently subjected during application by spraying. In view of this very fact, however, that the formulations hereof do break down so drastically in viscosity during spraying, judging from the prior art teachings severe spray drifting would be expected to be encountered. However, it was surprisingly found in accordance with the present invention that substantially no drifting occurred when these formulations were applied by spraying, and the reason for this was found to be due to the fact that they rapidly regained almost 100% of their viscosity loss substantially immediately after exiting the spray nozzle. These outstanding advantages of the formulations of the present invention are demonstrated by the foregoing examples.

The foregoing examples show various ways of successfully practicing the present invention, however those skilled in the field to which this invention relates will appreciate that many variations may be made in these conditions within the scope of the claims hereof.

The amount of polysaccharide gum, by weight of the total formulation, employed is not critical but it is important, particularly the lower amount thereof. Usually at least about 0.05% will be required. Although amounts greater than about 5% can be used, applicants are unaware of any situation wherein it would be justified or even beneficial. In most cases the preferred range is about 0.15%–2%, about 0.3%–1% being specifically preferred.

Although the ingredients and amounts thereof other than the polysaccharide gum are not per se a part of the present invention, they will now be discussed for the sake of completeness. In the first place it should be emphasized that the artisan, from the prior art teachings, will have no difficulty in selecting these other conditions suitable for use with applicant's polysaccharide gum in practicing the present invention. The present invention is applicable to any formulation containing a biologically active agent which formulation is in the form of a liquid in which the polysaccharide gum is soluble at the time of use (spraying), and it is immaterial whether the formulation is one containing a biologically active agent which is a herbicide, insecticide, fungicide, bactericide, nematocide, or other.

Some of the ingredients other than polysaccharide gum have already been given hereinbefore. These include a biologically active agent, a solvent or carrier for the biologically active agent and a surfactant. In the two phase system, e.g. an oil in water emulsion or dispersion, employed in Examples 1–5, kerosene was the solvent or carrier for the biologically active agent. The kerosene containing the biologically active agent was then dispersed in water with the aid of a surfactant. This gave a mixture wherein droplets of kerosene containing the biologically active agent were uniformly dispersed throughout the water, the kerosene containing biologically active agent being the discontinuous phase and water being the continuous phase. Of course water in oil type dispersions are also applicable. As is well known numerous other materials can be used for these phases, the particular one chosen depending considerably on the biologically active agent employed and its properties. However, in most cases in two phase systems the carrier is an organic liquid and the continuous phase is water. In the single phase system employed in Examples 6–10 the carrier was water, i.e. the biologically active agent was simply dissolved in water, and this is true in most single phase systems.

For the sake of completeness, the examples of some of the typical biologically active agents that are used in formulations to which the present invention is applicable, will now be given. Although these biologically active agents are listed hereinafter under the three headings Herbicides, Insecticides, Fungicides, this does not mean that they cannot serve other functions also.

*Herbicides*

(1) Polychlorinated acids, inorganic salts, amine salts, and esters thereof.

2,4-D, i.e. 2,4-dichlorophenoxyacetic acid
2,4,5-T, i.e. 2,4,5-trichlorophenoxyacetic acid
TCA, i.e. trichloroacetic acid
Polychlorobenzoic acid—
2,3,5-trichlorobenzoic acid
2,3,4,6-tetrachlorobenzoic acid.

(2) Substituted triazines, e.g. aminotriazines 2,4-bis(ethylamino)-6-chloro-1,3,5-triazine
2,4-bis(isoproplyamino)-6-methoxy-1,3,4-triazine.

(3) Aryl aliphatic ureas 3-(3,4-dichlorophenyl)-1,1-dimethylurea (4) Phenyl carbamates Isopropyl-N-(3-chlorophenyl) carbamate

*Insecticides*

(1) Phosphates

Malathion, i.e. O,O-dimethyl dithiophosphate of diethyl mercaptosuccinate
Parathion, i.e. O,O-diethyl-O-p-nitrophenyl thiophosphate.

(2) Chlorinated hydrocarbons

DDT, i.e. [1,1,1-trichloro-2,2-bis(p-chlorophenyl)ethane]
Methoxychlor, i.e. [1,1,1-trichloro-2,2-bis(p-methoxyphenyl)ethane]
Lindane, i.e. 1,2,3,4,5,6-hexachloro-cyclohexane
Toxaphene, i.e. chlorinated camphene
Dieldrin, i.e. 1,2,3,4,10,10 - hexachloro - 6,7 - epoxy - 1,4, 4a,5,6,7,8,8a - octahydro 1,4,5,8-dimethanonaphthalene
Chlordane, i.e. 1,2,4,5,6,7,8,8a-octachloro-2,3,3a,4,7,7a-hexahydro-4,7-methanoindene.

*Fungicides*

(1) Carbamates

Thiram, i.e. tetramethyl triuram disulfide
Ziram, i.e. zinc dimethyldithiocarbamate
Zineb, i.e. zinc ethylenebisdithiocarbamate (2) Heterocyclic nitrogen compounds Captan, i.e. N-trichloromethylmercapto-4-cyclohexene-1,2-dicarboximide (3) Quinones Phygon, i.e. 2,3-dichloro-1,4-naphthoquinone (4) Rhodanine derivatives 3-(p-chlorophenyl)-5-methylrhodanine.

In the emulsions of Examples 1–5, a surfactant was used, namely, nonylphenyl polyethylene glycol ether, which is commercially available under the proprietary designation "Tergiton–NP–27." The role of surfactants and emulsions in this art is well known and is no different than in any other art. A very large number of suitable surfactants are commercially available.

As is well known in the art to which this invention relates, the amount of biologically active agent employed will vary widely depending on many factors including the particular biologically active agent used and the job to be accomplished. This sometimes may be about 0.05%–20%, but more often will be about 0.1%–10%, by weight of the total formulation.

The formulations of the present invention may contain additional ingredients commonly employed, e.g. antifoaming agents, dispersing agents, corrosion inhibitors, preservatives, freeze point depressants, dyes, pigments, and the like.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. An improved easily sprayable liquid composition having low spray drift properties which comprises water, an effective amount of a herbicide, and a water soluble microbial polysaccharide gum produced by the submerged aerobic fermentation of an inoculum of *Arthrobacter viscosus* NRRL B–1973, the amount of said gum being about 0.05%–5.0% by weight of said composition.

2. The composition of claim 1 wherein the microorganism is *Arthrobacter viscosus* NRRL B–1797.

3. A method of substantially reducing spray drift without appreciably increasing the force required to spray in the application of a biologically active agent hereinafter defined which comprises spraying a liquid composition containing an effective amount of a herbicide, and as a spray drift reducing agent an aqueous solution of a water soluble microbial polysaccharide gum produced by the submerged aerobic fermentation of an inoculum of *Arthrobacter viscosus* NRRL B–1973, the amount of said gum being about 0.05%–5.0% by weight of said composition.

4. The method of claim 3 wherein the microorganism is *Arthrobacter viscosus* NRRL B–1797.

5. The method of claim 3 wherein said liquid composition is an aqueous solution.

6. The method of claim 3 wherein said liquid composition is a dispersion.

References Cited

UNITED STATES PATENTS

| | | | |
|---|---|---|---|
| 3,228,855 | 1/1966 | Cadmus et al. | 195—31 |
| 3,258,326 | 6/1966 | Rabussier | 167—42 |
| 3,175,898 | 3/1965 | Seymour et al. | 71—117 |

FOREIGN PATENTS

| | | |
|---|---|---|
| 630,023 | 10/1949 | England. |
| 630,090 | 10/1949 | England. |
| 649,320 | 10/1964 | Belgium. |

OTHER REFERENCES

Baker: Dextrans, Industrial Gums (1959) pp. 531 and 548.

Dudlik: Herbicide dispersions (1964) CA 64 p. 7298 (1966).

LEWIS GOTTS, Primary Examiner

G. HOLLRAH, Assistant Examiner

U.S. Cl. X.R.

71—79, 94, 106, 109, 110, 111, 113, 115, 116, 117, 120; 424—213, 218, 270, 274, 278, 286, 328, 331, 341, 354, 361